(12) United States Patent
Mihara et al.

(10) Patent No.: US 6,368,734 B1
(45) Date of Patent: Apr. 9, 2002

(54) NTC THERMISTORS AND NTC THERMISTOR CHIPS

(75) Inventors: Kenjiro Mihara; Yuichi Takaoka, both of Shiga (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/427,854

(22) Filed: Oct. 27, 1999

(30) Foreign Application Priority Data

Nov. 6, 1998 (JP) .......................................... 10-316032

(51) Int. Cl.$^7$ ............................. B32B 9/00; H01C 7/04
(52) U.S. Cl. .................... 428/699; 257/703; 323/369; 338/22 R; 338/22 SD; 361/103; 361/106; 428/701; 428/929; 501/126; 501/152
(58) Field of Search ................... 323/369; 338/22 R, 338/22 SD; 501/152, 126; 257/703; 252/521.1; 361/103, 106; 428/699, 701, 929

(56) References Cited

U.S. PATENT DOCUMENTS 4,541,898 A * 9/1985 Mase et al. ............... 338/22 R 5,858,902 A * 1/1999 Ishikawa et al. ............ 501/152

FOREIGN PATENT DOCUMENTS

| JP | 63-266801 | 11/1988 |
| JP | 01-050501 | 2/1989 |

* cited by examiner

*Primary Examiner*—Robert R. Koehler
(74) *Attorney, Agent, or Firm*—Beyer Weaver & Thomas LLP

(57) ABSTRACT

An NTC thermistor has an electrically insulating substrate, a temperature-sensitive film on a surface of the substrate containing oxide of rare earth elements such as $LaCoO_3$ as its principal component by at least 50 weight %, and a pair of electrodes which are separated from each other and are each electrically connected to this film. An NTC thermistor chip is obtained by further forming a pair of outer electrodes which are each on a corresponding end portion and electrically connected to a corresponding one of the surface electrodes.

4 Claims, 3 Drawing Sheets

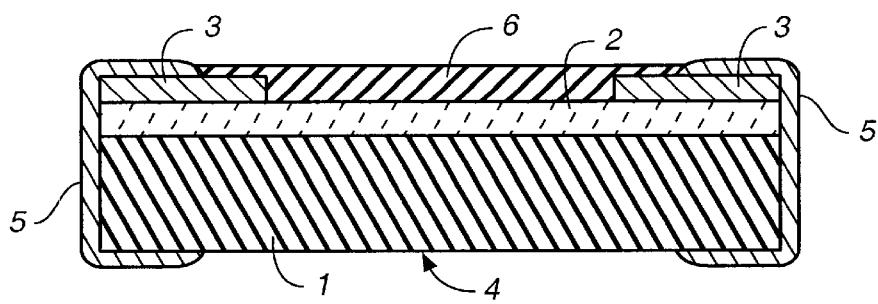
FIG._1A
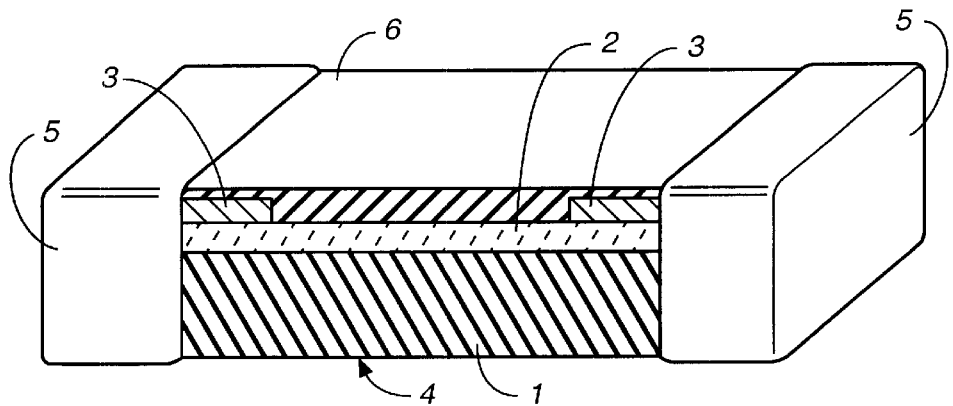
FIG._1B
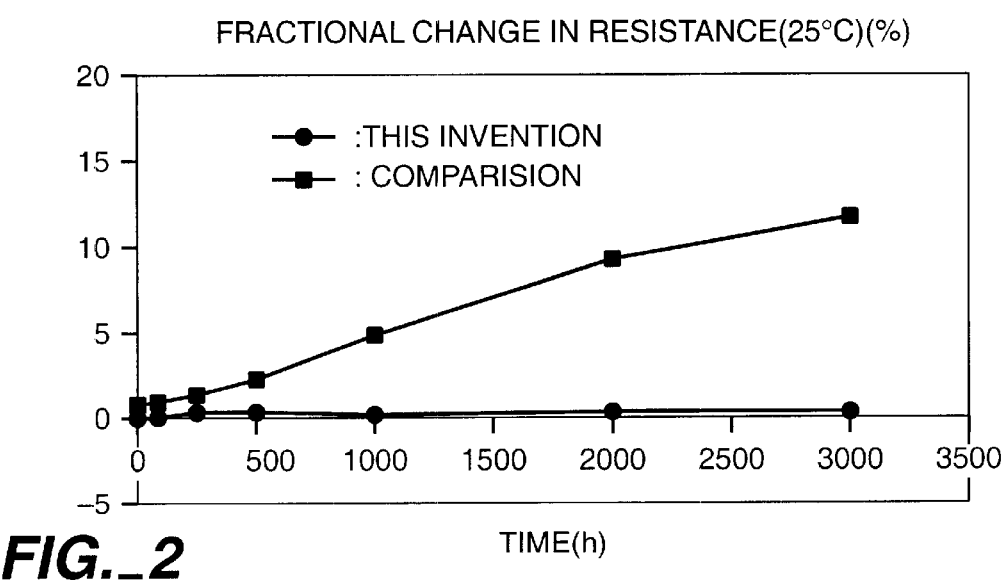
FIG._2

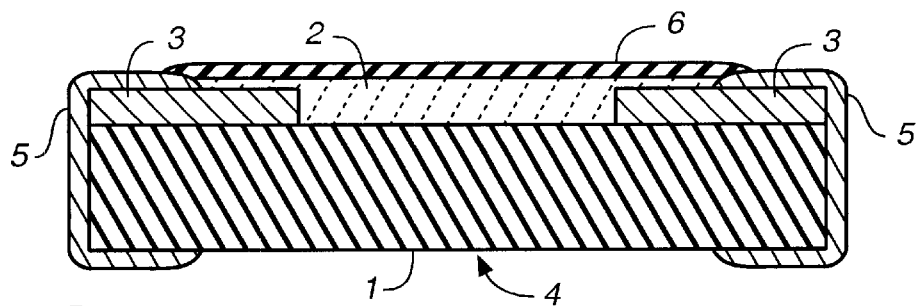
FIG._3A
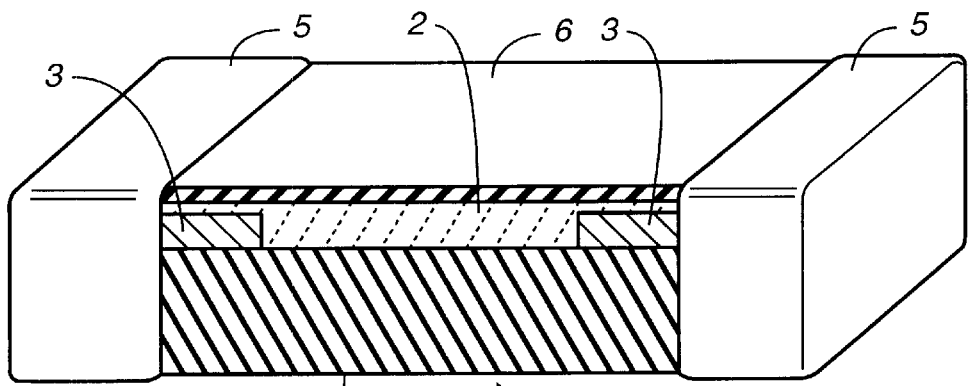
FIG._3B
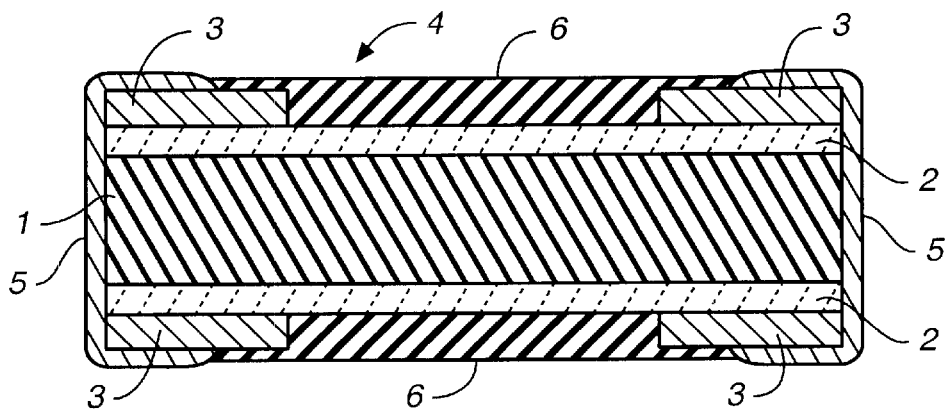
FIG._4A

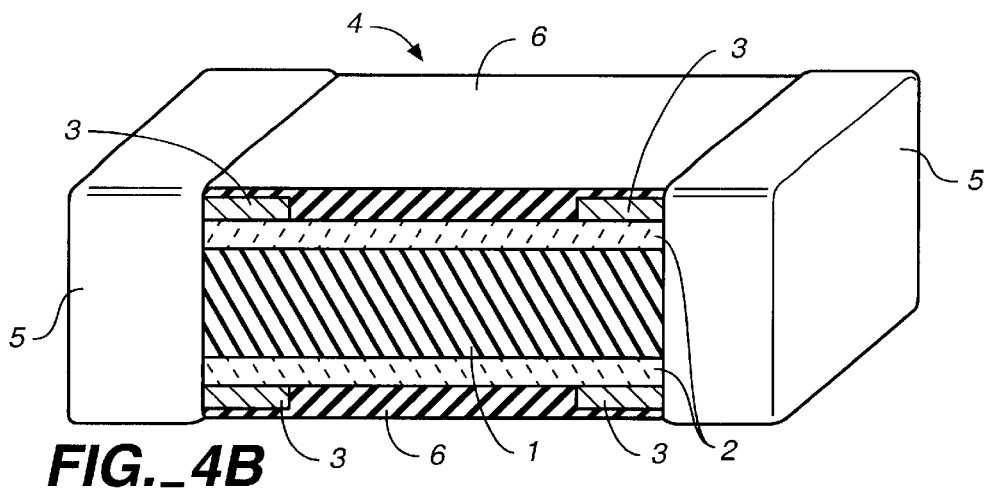
FIG._4B
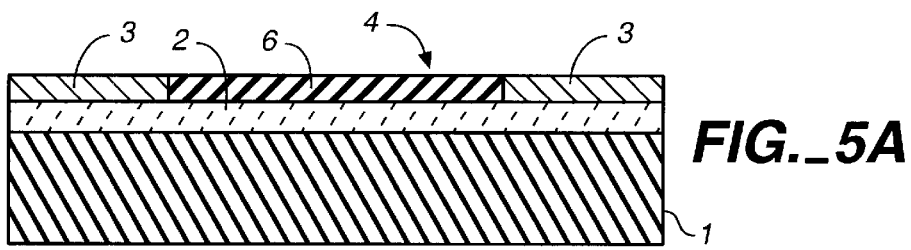
FIG._5A
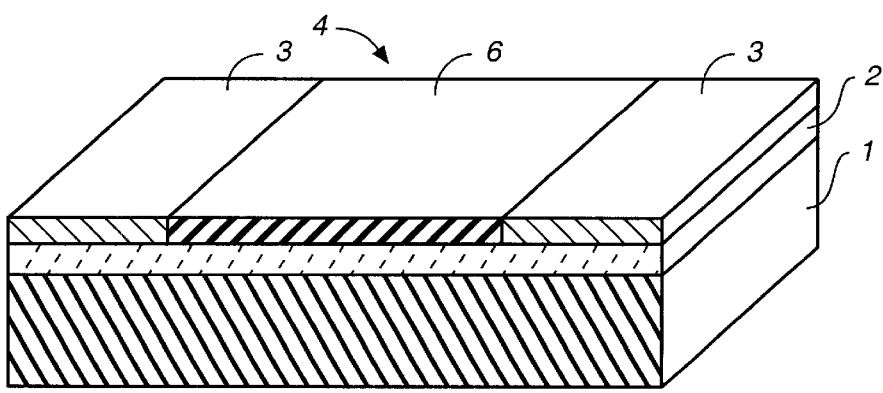
FIG._5B
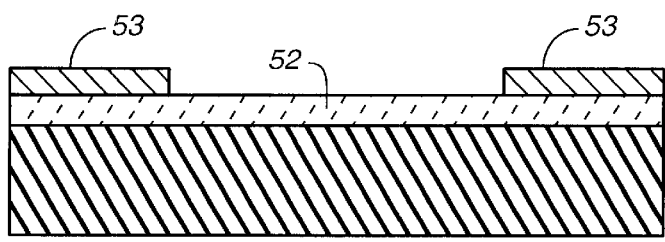
FIG._6
(PRIOR ART)

NTC THERMISTORS AND NTC THERMISTOR CHIPS

BACKGROUND OF THE INVENTION

This invention relates to NTC (negative temperature coefficient) thermistors, and more particularly to NTC thermistors of the so-called film type having a temperature-sensitive film formed on an electrically insulating substrate by a thin-film or thick-film forming process.

NTC thermistors are widely being used for the purposes of temperature detection and temperature compensation. Japanese Patent Publication Tokkai 64-50501, for example, disclosed an NTC thermistor of a film type having a temperature-sensitive film formed on an electrically insulating substrate by a process of high-frequency sputtering in order to improve the response characteristic when used for purposes such as temperature detection.

FIG. 6 shows an example of prior art NTC thermistor of a film type having an electrically insulating substrate 51 (herein referred to simply as the "substrate") made of an electrically insulating material, a temperature-sensitive film ("thermistor film") 52 made of a thermistor material on the surface of the substrate 51 and a pair of electrodes ("surface electrodes") 53 formed on the surface of the temperature-sensitive film 52. Compared to an NTC thermistor of a so-called bulk type characterized as having a thermistor element for temperature detection with electrodes formed on a thermistor member entirely made of a thermistor material, such an NTC thermistor of a film type is advantageous not only wherein only a smaller amount of a thermistor material is required but also wherein the response time, which is the most important characteristic of an NTC thermistor for temperature detection, can be significantly improved because its thermal capacity is small.

For making prior art NTC thermistors of the film type, however, thermistor materials including oxides of transition metals such as Mn, Ni, Co, Fe and Cu which are used for the production of NTC thermistors of a bulk type were used for their temperature-sensitive film. Such materials usually have a specific resistance equal to or greater than 500 $\Omega$cm. NTC thermistors of a bulk type having a desired resistance value can be obtained with such a thermistor material, but if such a thermistor material is used for the production of an NTC thermistor of a film type as shown in FIG. 6, its resistance value becomes much higher than that of a prior art bulk type NTC thermistor.

In view of this problem, aforementioned Japanese Patent Publication Tokkai 64-50501 disclosed a method of oxidizing the film, after it is formed by a high-frequency sputtering method, by a plasma process inside an atmosphere of an oxidizing gas. This production method is disadvantageous because an extra equipment is required for carrying out the plasma processing after the film is formed and the production process as a whole takes a much longer time.

Japanese Patent Publication 63-266801 disclosed a method of providing electrodes on both upper and lower surfaces of a temperature-sensitive resistor film. With a thermistor thus structured, however, since the thickness of the temperature-sensitive resistor film is extremely small and the distance by which the electrodes are separated from each other is the same as this film thickness, troubles such as short-circuiting are more likely to occur.

SUMMARY OF THE INVENTION

It is therefore an object of this invention, in view of the situation described above, to provide a reliable NTC thermistor with a fast response speed in temperature detection and a low resistance value.

An NTC thermistor embodying this invention, with which the above and other objects can be accomplished, may be characterized as comprising an electrically insulating substrate, a temperature-sensitive film on a surface of the substrate containing oxide of rare earth elements such as $LaCoO_3$ as its principal component by at least 50 weight %, and a pair of electrodes which are separated from each other and are each electrically connected to this film. An NTC thermistor chip embodying this invention can be obtained therefrom by further forming a pair of outer electrodes which are each on a corresponding one of the end portions and electrically connected to a corresponding one of the surface electrodes.

By thus forming an NTC thermistor of a film type, the speed of response can be improved significantly over the prior art NTC thermistors of the bulk type using oxides of transition metals such as Mn, Ni, Co, Fe and Cu while the resistance value can be as low as that of such a bulk type NTC thermistor. Moreover, NTC thermistors according to this invention are found to be reliable in that the fractional change in the resistance value by a shelf test can be made small.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1A is a sectional view and

FIG. 1B is an external diagonal (and in part sectional) view of an NTC thermistor chip embodying this invention;

FIG. 2 is a graph for showing the relationship between the fractional change in the resistance value and time in a shelf test on NTC thermistors embodying this invention and comparison samples;

FIG. 3A is a sectional view and

FIG. 3B is an external diagonal (and in part sectional) view of another NTC thermistor chip according to a second embodiment of this invention;

FIG. 4A is a sectional view and

FIG. 4B is an external diagonal (and in part sectional) view of still another NTC thermistor chip according to a third embodiment of this invention;

FIG. 5A is a sectional view and

FIG. 5B is an external diagonal (and in part sectional) view of still another NTC thermistor chip according to a fourth embodiment of this invention; and FIG. 6 is a sectional view of a prior art NTC thermistor of a film type.

Throughout herein, like or equivalent components are indicated by the same numerals even where these components belong to different thermistors and may not necessarily be described repetitiously for the simplicity of disclosure.

DETAILED DESCRIPTION OF THE INVENTION

The invention will be described next by way of examples. FIGS. 1A and 1B show an NTC thermistor chip according to a first embodiment of this invention, having an electrically insulating substrate ("substrate") 1 made of an electrically insulating material, a temperature-sensitive resistor film ("thermistor film") 2 formed on a surface of the substrate 1, and a pair of electrodes ("surface electrodes") 3 on the surface of the thermistor film 2 to together form what is hereinafter referred to as an element 4 and also having a pair of outer electrodes 5 provided at both end portions of the element 4 so as to be each in an electrically conductive relationship with a corresponding one of the surface electrodes 3 and an electrically insulating coating material 6 which covers both the thermistor film 2 and the surfaces of the surface electrodes 3. FIG. 1B shows an example whereby side surfaces of the thermistor film 2 and the surface electrodes 3 are externally exposed, but the insulating coating material 6 may be applied so as to prevent them from being exposed externally. In fact, the insulating coating material 6 may cover all otherwise exposed external surfaces of the NTC thermistor chip except where the outer electrodes 5 are formed.

Such an NTC thermistor may be formed as follows. Firstly, an alumina substrate is prepared to serve as the electrically insulating substrate 1. Next, the thermistor film 2 is formed on the substrate 1 by using a high-frequency sputtering apparatus with a molded body of an oxide of rare earth transition element including La and Co such as $LaCoO_3$ as its principal constituent by 50 weight % or more. The high-frequency sputtering process may be carried out in an atmosphere of Ar, with the temperature of the substrate 1 at 500° C., the high-frequency electric power of 800 W and at film-forming speed of 3 $\mu$m/hour. Next, a heat treatment is carried out at a temperature within the range of 300–1000° C. for a time duration suitable to the selected temperature in order to improve the crystalline characteristics of the thermistor film 2 and to stabilize the film.

Next, electrodes are formed on the substrate 1 thus prepared with the thermistor film 2 formed thereon. These are electrodes which are later to become the pair of mutually oppositely facing surface electrodes 3 when this substrate is cut and divided into the individual elements 4 as shown in FIGS. 1A and 1B. This may be done by a sputtering process by using a silver target to form thin-film Ag electrodes. After the substrate 1 is cut at suitable positions to obtain the individual elements 4, the outer electrodes 5 are formed on both end parts of each of the elements 4 so as to be each in an electrically contacting relationship with a corresponding one of the pair of surface electrodes 3. Each outer electrode 5 is formed not only on one of the mutually oppositely facing side surfaces of the planar substrate 1 but also continuously over portions of its upper and lower surfaces abutting the side surface.

Next, the surfaces of the thermistor film 2 and the surface electrodes 3 are covered by an electrically insulating glass coating material 6 in order to protect the thermistor film 2 and the surface electrodes 3, thereby obtaining an NTC thermistor as shown in FIGS. 1A and 1B.

Test experiments were carried out on the NTC thermistors thus produced to measure the specific resistance of the thermistor film 2 and the resistance value of the NTC thermistor. Shelf tests were also carried out to examine the reliability of the products under a high-temperature condition.

For the purpose of such tests and experiments, comparison samples were also prepared by using the kind of thermistor materials used for the production of prior art NTC thermistors of the bulk type to obtain NTC thermistors of a film type. These comparison samples were produced firstly by preparing an alumina substrate, like the one used for the preparation of the test samples embodying this invention. After a thermistor film was formed by using a high-frequency sputtering apparatus with a prior art thermistor material including oxides of Mn, Ni and Co as the sputtering target and within an atmosphere of argon with the temperature of the substrate at 500° C., the high-frequency electric power of 800 W and at film-forming speed of 3 $\mu$m/hour, a heat treatment was carried out at a temperature within the range of 300–1000° C. for a time duration suitable to the selected temperature. Another sputtering process was carried out thereafter to form electrodes, later to become the pair of surface electrodes, on the substrate with the thermistor film thereon. Thereafter, outer electrodes and glass coating were formed as explained above with reference to the production of NTC thermistors embodying this invention.

It was ascertained by test experiments that the specific resistance of thermistor film on these comparison samples was over 2000 $\Omega$cm but that it was only about 100 $\Omega$cm with the NTC thermistors embodying this invention. It was also ascertained that NTC thermistors for temperature detection having resistance values in the range of 1k–10 k$\Omega$ can be easily accommodated by the NTC thermistors embodying this invention although it was difficult to do so with comparison samples having the same thermistor film thickness and dimensions and positional relationship of the surface electrodes.

FIG. 2 shows the result of a shelf test, indicating that the fractional change in the resistance value grows with time in the case of a prior art comparison sample but NTC thermistors of the present invention are stable and highly reliable, its resistance value not changing substantially even after the samples have been left in a high-temperature condition for an extended period of time.

FIGS. 3A and 3B show another NTC thermistor chip according to a second embodiment of the invention. This NTC thermistor chip is produced by firstly forming a pair of surface electrodes 3 at two end positions on the upper surface of a substrate 1 and then forming a thermistor film 2 on middle part of the upper surface of the substrate 1 so as to be connected to both of the surface electrodes 3. A pair of outer electrodes 5 are formed on both mutually oppositely facing side surfaces of the substrate 1 (the element 4) so as to be each electrically connected to a corresponding one of the surface electrodes 3, and the surfaces of the thermistor film 2 and the surface electrodes 3 are covered entirely with an insulating glass coating material 6. In the description above, the order of forming the thermistor film 2 and the outer electrodes 5 may be reversed. The materials for each of the components are the same as those described above with reference to the first embodiment of the invention. Each step of the production process may be carried out also similarly.

FIGS. 4A and 4B show still another NTC thermistor chip according to a third embodiment of this invention which is different from the first and second embodiments of the invention described above with reference to FIGS. 1A, 1B, 3A and 3B wherein thermistor films 2 and pairs of surface electrodes 3 are formed both on the upper and lower surfaces of the planar substrate 1. Outer electrodes 5 on both mutually oppositely facing side surfaces of the substrate 1 (the element 4) are each in electrically connected relationship with corresponding ones of the pairs of the surface electrodes 3 and an insulating layer 6 of a glass coating material covers the thermistor film 2 and the surface electrodes 3 on both surfaces of the substrate 1. NTC thermistor chips according to this embodiment can be produced in a similar manner as described above.

FIGS. 5A and 5B show still another NTC thermistor chip according to a fourth embodiment of this invention characterized as having a simpler structure without the outer electrodes. It is prepared by forming a thermistor film 2 all over the upper surface of a substrate 1 and a pair of mutually separated surface electrodes 3 at both end parts on the upper surface of the substrate 1 and covering the middle part of the upper surface of the substrate 1 not covered by the surface electrodes 3 with an electrically insulating layer 6 of a glass coating material. This embodiment shows that NTC thermistor chips of a simplified structure can be used, depending on the purpose for which it is to be used, such that the production process can be simplified and the material cost can be reduced. It now goes without saying that the production processes and materials described above with reference to the first, second and third embodiments of the invention can also be used for the fourth embodiment of the invention.

The invention has been described above with reference to only a limited number of examples, but these examples are not intended to limit the scope of the invention. Many modifications and variations are possible within the scope of the invention. For example, the electrically insulating material for the substrate need not be alumina. Silicon substrates with an electrically insulating oxide film on the surface, glass substrates and many other kinds of substrates can be used for the purpose. As the sputtering target for forming the thermistor film, use need not be made of a sintered and molded body of oxides of rare earth transition elements including La and Co such as $LaCoO_3$. Powders obtained by pulverizing such a body may be equally well used as the target for the sputtering process.

Moreover, it need not be by sputtering that the thermistor film should be formed. The thermistor film according to this invention may be formed by a thin-film forming method such as the alkoxide method, a thick-film forming method such as coating the substrate with a paste of a thermistor material and subjecting it to a firing process, or many other alternative kinds of methods. The material for the surface electrodes need not be Ag. Use therefor may be made of any other material such as Pt, Pd and their alloys that can make an ohmic contact with the thermistor film to obtain similar effects.

Although the figures show only rectangular surface electrodes, neither is this intended to limit the scope of the invention. The surface electrodes may be so-called comb-shaped electrodes of the kind having fingers protruding mutually parallel to one another from a main portion. In summary, the disclosure is intended to be interpreted broadly. The scope of the invention is certainly not limited by the geometrical shape of the substrate or the pattern of the thermistor film. NTC thermistors of this invention is characterized as having a thermistor film comprising $LaCoO_3$ connecting between a pair of electrodes. As a result, the response time can be significantly improved from the prior art NTC thermistors of the bulk type using oxides of transition metals such as Mn, Ni, Co, Fe and Cu. This invention also provides NTC thermistors of a film type with a resistance value as low as attainable by the prior art bulk thermistors and the fractional change in the specific resistance in a shelf test can be reduced even under a condition of a high temperature.

What is claimed is:

1. An NTC thermistor comprising:
   an electrically insulating substrate having a surface;
   a temperature-sensitive film on said surface of said substrate, said film containing $LaCoO_3$ by at least 50 weight %; and
   a pair of electrodes which are separated from each other and are each electrically connected to said film.

2. The NTC thermistor of claim 1 wherein said film has a negative temperature coefficient.

3. An NTC thermistor chip comprising:
   an electrically insulating substrate having a surface and two end portions which are mutually separated;
   a temperature-sensitive film on said surface of said substrate, said film containing $LaCoO_3$ by at least 50 weight %;
   a pair of mutually separated surface electrodes which are each electrically connected to said film and on a corresponding one of said end portions; and
   a pair of outer electrodes which are each on a corresponding one of said end portions and electrically connected to a corresponding one of said surface electrodes.

4. The NTC thermistor chip of claim 3 wherein said film has a negative temperature coefficient.

* * * * *